United States Patent [19]
Yoneda et al.

[11] Patent Number: 5,852,405
[45] Date of Patent: Dec. 22, 1998

[54] WIRELESS LAN SYSTEM

[75] Inventors: Norihiro Yoneda; Kiyotaka Shikata, both of Kawasaki, Japan

[73] Assignee: Fujitsu Limited, Kanagawa, Japan

[21] Appl. No.: 548,532

[22] Filed: Oct. 26, 1995

[30] Foreign Application Priority Data

Mar. 17, 1995 [JP] Japan .................................. 7-058608

[51] Int. Cl.⁶ .................................................. H04Q 7/00
[52] U.S. Cl. ............................. 340/825.02; 340/825.04; 340/825.06; 395/200.02; 370/328; 370/329; 370/338
[58] Field of Search ......................... 340/825.02, 825.04, 340/825.03, 825.06, 825.07; 395/200.05, 200.02; 455/33.1, 33.2, 33.4; 370/310, 315, 316, 328, 329, 338

[56] References Cited

U.S. PATENT DOCUMENTS

| | | | |
|---|---|---|---|
| 4,427,968 | 1/1984 | York ..................................... | 340/310 R |
| 4,482,999 | 11/1984 | Janson et al. ............................... | 370/86 |
| 4,773,066 | 9/1988 | Kirkman .................................... | 370/85 |
| 4,809,268 | 2/1989 | Tejima et al. ............................... | 370/93 |
| 4,831,373 | 5/1989 | Hess ..................................... | 340/825.03 |
| 4,998,245 | 3/1991 | Tanaka et al. ........................... | 370/85.1 |
| 5,049,872 | 9/1991 | Yamanaka et al. ................. | 340/825.05 |
| 5,220,562 | 6/1993 | Takada et al. ......................... | 370/85.13 |
| 5,241,542 | 8/1993 | Natarajan et al. ...................... | 370/95.3 |
| 5,371,780 | 12/1994 | Amitay ....................................... | 379/58 |
| 5,424,859 | 6/1995 | Uehara et al. ........................... | 359/152 |
| 5,455,569 | 10/1995 | Sherman et al. .................... | 340/825.02 |
| 5,483,522 | 1/1996 | Derby et al. ................................ | 370/54 |
| 5,553,069 | 9/1996 | Ueno et al. ................................. | 370/75 |
| 5,559,804 | 9/1996 | Amada et al. ........................... | 370/95.3 |
| 5,570,364 | 10/1996 | Bar-David ................................. | 370/79 |
| 5,594,426 | 1/1997 | Ushijima et al. ................... | 340/825.02 |

*Primary Examiner*—Michael Horabik
*Assistant Examiner*—Yonel Beaulieu
*Attorney, Agent, or Firm*—Helfgott & Karas, P C.

[57] ABSTRACT

In a wireless LAN system having two or more master stations each connected to a wired LAN and a plurality of slave stations each connected to a terminal for wirelessly sending and receiving signals to and from the master station via a prescribed channel, each master station is provided with a table for managing the state of channel use. The master station has a LAN controller which periodically notifies the other master station of the state of use of its own channel via a notification packet. Upon receiving a notification packet sent periodically from the other master station, the LAN controller stores the state of use of the channel of the other master station, of which it has been notified by the notification packet, in the channel management table. When it becomes necessary to allocate a channel to the slave station under its supervision, the LAN controller refers to the channel management table, selects a channel that is not being used by any other master station, allocates the selected channel to the slave station and communicates with the slave station. The LAN controller stores the state of use of its own channel in the table.

10 Claims, 10 Drawing Sheets

FIG.6

| CHANNEL | INDICATION OF OWN CHANNEL IN USE | INDICATION OF CHANNEL IN USE BY OTHER STATION |
|---|---|---|
| FIRST CHANNEL | | ON, ADDRESS OF ANOTHER MASTER STATION |
| SECOND CHANNEL | ON | |
| ⋮ | ⋮ | ⋮ |
| n-th CHANNEL | | |

| SLAVE STATION ADDRESS | ALLOCATED CHANNEL |
|---|---|
| | |
| | |
| | |

23a, 23b

WIRELESS LAN SYSTEM

BACKGROUND OF THE INVENTION

This invention relates to a wireless LAN system and, more particularly, to a wireless LAN system having two or more master stations each connected to a wired LAN and slave stations connected to terminals for wirelessly sending and receiving signals to and from the master stations.

Use of LANs (Large Area Networks) is becoming increasingly popular at a rapid rate. A LAN allows data communication among a plurality of terminals, such as personal computers or work stations, installed at scattered locations at the same site, or between the terminals and a host computer, and allows programs and data files to be shared. Such a LAN basically is a wired LAN which connects each terminal or the host computer to basic cables (LAN cables) in the network.

When the number of terminals connected to the network in a wired LAN increases, the wiring laid within the room becomes very complicated. In a case where a terminal is portable, the advantage of portability is lost when the terminal is physically connected to the basic cable.

A wireless LAN has been proposed and is being put into practical use for the purpose of solving the aforementioned problems which arise with a wired LAN. In a wireless LAN, a backbone LAN is constructed by installing the basic cable in a ceiling or the like and installing a plurality of master stations each having a wireless device capable of transmitting signals to and receiving signals from the basic cable. Slave stations (each incorporating radio equipment) connected to terminals communicate with one another wirelessly via the backbone LAN. In accordance with this wireless LAN, it is unnecessary to connect the slave terminals to the basic cable. This solves the wiring problems of the wired LAN and does not detract from the original features of a portable terminal.

FIG. 12 is a diagram for describing master stations in a wireless LAN system and areas (cells) in which the master stations can communicate with slave stations. FIGS. 1a, 2a denote master stations, 1b, 2b areas (cells), conforming to the master stations, in which signals can be sent and received, and 1c, 2c slave stations. Each master station is so adapted as to be capable of sending and receiving frames (packets) via a backbone LAN, which is not shown. Multiple cells are arranged in such a manner that the cells of the master stations 1a, 2a partially overlap each other. The reason for constructing multiple cells in this manner is to arrange it so that communication via the LAN will not be interrupted even when a slave station is moved between cells while being carried or to eliminate blank areas in which LAN communication cannot be performed.

In such a multiple-cell environment, a problem which arises is that a packet received from the slave station 2c, which is present in an area in which neighboring cells overlap, is received by a plurality of master stations 1a, 2a, each of which sends the received frame to the backbone LAN at the same time, thereby causing frame collision and inviting loss of frames. Though control for re-sending frames upon changing the transmission timing is performed when collision occurs, a problem which arises in such case is that identical frames are sent to the receiving party in redundant fashion.

In order to avoid the interference problem which arises when adjacent cells overlap, a first method is to set beforehand the channel used by each master station so as to be different from the channels of adjacent stations. For example, a channel is made different from the channels of adjacent cells by changing the frequency, the frequency hopping sequence (Frequency Hopping Sequence Spread Spectrum, or FHSS), the diffusion code (Direct Sequence Spread Spectrum, or DSSS), the time slot, etc. A second method is one in which the channels used are not set in advance.

A problem encountered with the first method is that the channels used must be set before the system is operated, as a result of which system design takes time and there is a decline in the number of channels that can be used.

A problem which arises with the second method is hidden terminals. More specifically, if the slave station 1c is communicating upon obtaining transmission permission from the master station 1a on a certain channel CHi, there are cases where the slave station 2c present in the area where the cells 1b and 2b overlap performs communication upon being allocated with a channel, which is identical with channel CHi, by the master station 2a. In such case the slave station 2c transmits a packet to the master station 2a as well. In the master station 1a, therefore, the packets from the slave stations 1c, 2c collide. This is the so-called "hidden terminal" problem.

Further, in a multiple-cell environment in which the master stations 1a, 2a reside in an area in which the cells 1b and 2b overlap, as shown in FIG. 13, the master stations send and receive information to and from each other by radio waves (wirelessly) and not by a wired LAN. That is, though the backbone LAN is constructed by a wireless LAN rather than a wired LAN, complicated processing is required in order to obtain the information of another master station from radio waves. This places a large burden upon the master stations.

SUMMARY OF THE INVENTION

A first object of the present invention is to arrange it so that the problem of hidden terminals in a wireless LAN system will not occur.

A second object of the present invention is to provide a wireless LAN system in which master stations are connected by a wired LAN and inform one another of channels used, whereby each master station ascertains a channel not being used by other master stations, selects the channel not being used and allocates it to a slave station to communicate with the slave station.

A third object of the present invention is to provide a wireless LAN system in which, when it becomes necessary for a master station to allocate a channel to a slave station and an idle channel does not exist, the master station interrogates other master stations with regard to the state of use of a prescribed channel and, if the channel is not being used, makes use of this channel, thereby performing channel allocation more efficiently.

A fourth object of the present invention is to provide a wireless LAN system in which a packet (a notification packet) notifying of a channel used and a packet (synchronous packet) requesting a channel are blocked at a network repeater such as a bridge, thereby making it possible to prevent an increase in the traffic of other wired LANs.

The first through third objects of the invention of the present invention are attained by providing a wireless LAN system having two or more master stations each connected to a wired LAN and a plurality of slave stations each connected to a terminal for wirelessly sending and receiving signals to and from the master stations via a prescribed channel, wherein each master station comprises a table for managing state of use of channels, means for transmitting state of use of its own channel to other master stations periodically in the form of a notification packet, means for storing state of use of channel of another master station in the table when a notification packet has been received from the other master station, means for selecting a channel not being used by any other master station upon referring to the table when communication is to be performed with a slave station under its supervision, and means for communicating with the slave station via the channel selected.

Further, according to the present invention, the wireless LAN system for attaining the fourth object includes a network repeater connected to a plurality of wired LANs for relaying packets sent and received between wired LANs, wherein each master station transmits the notification packet or synchronous packet in the form of a short packet no larger than a minimum packet length stipulated for the wired LANs or changes a CRC operational code to a predetermined CRC operational code and transmits the notification packet or synchronous packet, the network repeater detects the short packet or the packet of a CRC error and then discards the packet, and another master station connected to the same wired LAN as the above-mentioned master station accepts and processes the short packet or the packet having the predetermined CRC operational code without discarding the packet.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram showing the composition of table for managing channels used;

FIG. 7 is a diagram showing the composition of a slave-station management address table;

FIG. 8 is a flowchart of processing executed when a power supply is turned on;

DESCRIPTION OF THE PREFERRED EMBODIMENTS (A) Overview of the invention

Figure 1:
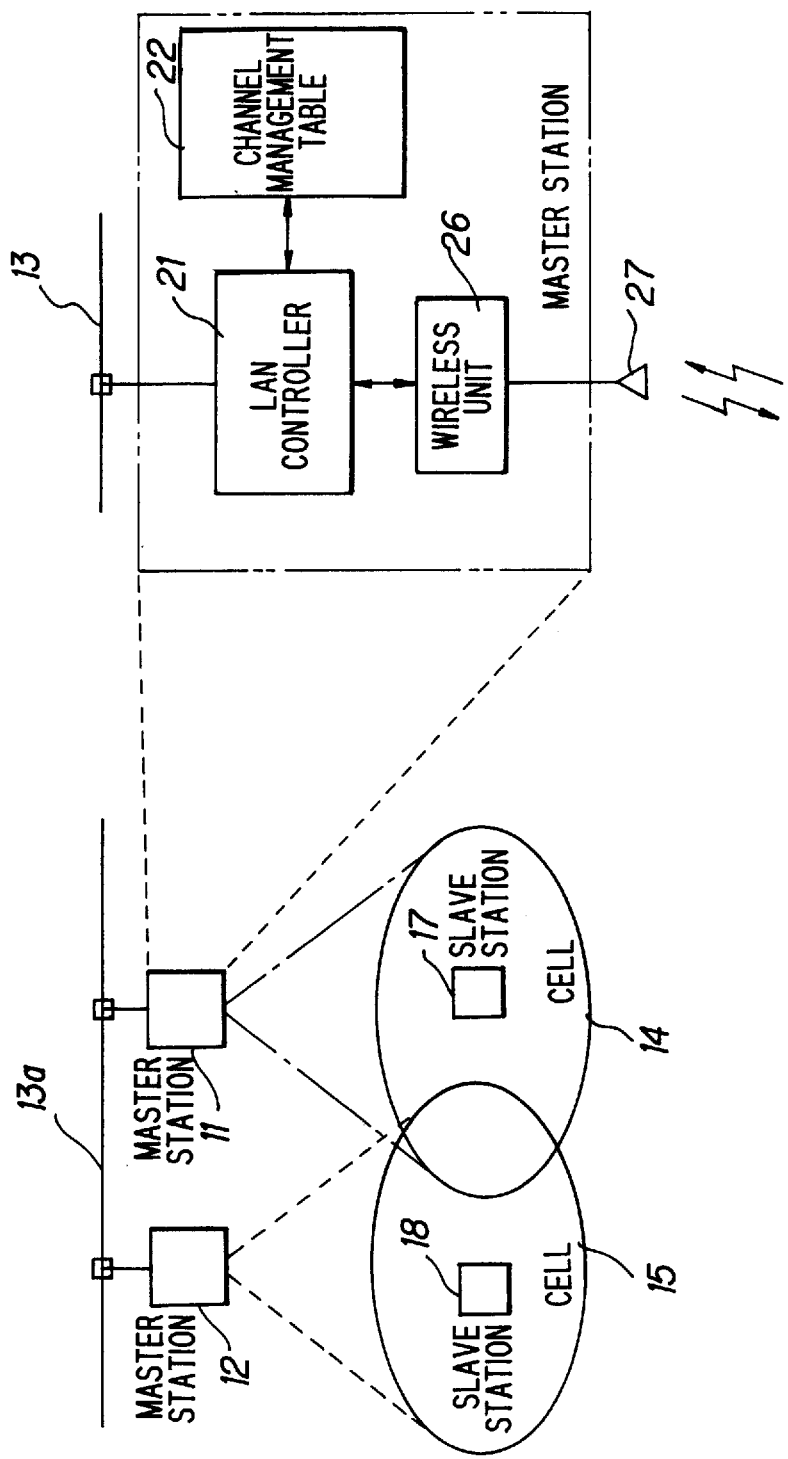
FIG. 1 is a diagram for describing an overview of the present invention.

FIG. 1 is a diagram for describing an overview of a wireless LAN system according to the present invention.

As shown in FIG. 1, the wireless LAN system includes master stations 11, 12 for sending/receiving frames (packets) to/from slave stations, a wired LAN 13a serving as a backbone LAN to which the master stations are connected, cells 14, 15 conforming to the master stations 11, 12, and slave stations 17, 18.

Each master station has a LAN controller 21, a channel management table 22 for managing the state of use of channels, a transceiver (radio equipment) 26 and an antenna 27.

Thus, the master stations 11, 12 connected to the wired LAN 13a are each provided with the channel management table 22 for managing the state of use of channels. The LAN controller 21 periodically notifies the other master station of the state of use of its own channel via a notification packet. Upon receiving a notification packet sent periodically from the other master station, the LAN controller 21 stores the state of use of the channel of the other master station, of which it has been notified by the notification packet, in the table 22. When it becomes necessary to allocate a channel to the slave station 17 under its supervision, the LAN controller 21 refers to the table 22, selects a channel that is not being used by any other master station, allocates the selected channel to the slave station and communicates with the slave station. In this case, the LAN controller 21 stores the state of use of its own channel in the table 22.

If this arrangement is adopted, the problem of hidden terminals does not arise because the same channel is not allocated to slave stations redundantly in two neighboring cells.

In a case where all channels are in use and an idle channel for allocation to a slave station does not exist, a master station sends the other master station a synchronous packet containing identification data of a channel desired to be used. If it is ascertained by a packet in response to the synchronous packet that the other station is not using the above-mentioned channel, the master station immediately selects this channel and communicates with the slave station. Thus, a channel desired for use can be used immediately if it is not being used by another master station. If the channel is being used, the master station can use the channel at the end of its use. This makes channel allocation more efficient.

In this case, the master station that has received the synchronous packet refers to the table 22 to determine whether the channel specified by the identification data contained in the synchronous packet is being used by the master station itself. If this channel is not in use, then the master station transmits an ACK packet as the response packet. If the channel is being used, the master station transmits the ACK packet after use of the channel ends. Further, the master station that has received the synchronous packet is also capable of transmitting a notification packet as the response to the synchronous packet.

When the wireless LAN system becomes extensive, a plurality of wired LANs are provided and the wired LANs are interconnected by a network repeater such as a bridge. If the wired LANs differ in such a system, the problem of hidden terminals will not arise even if the same channel is allocated redundantly. Here the master station transmits the notification packet or synchronous packet in the form of a short packet of less than the minimum packet length stipulated for the wired LANs. The network repeater detects and discards the short packet but another master station connected to the same wired LAN as the above-mentioned master station accepts the short packet and executes the above-mentioned channel allocation processing, processing for updating the used-channel management table and processing for transmitting various packets, etc. If this arrangement is adopted, a notification packet or synchronous packet will not be sent to another wired LAN and, hence, there will be no increase in the traffic of the other wired LAN. Moreover, since the packet has the form of the short packet, the traffic carried by the wired LAN to which the master station can be suppressed.

Further, instead of using the short packet, a master station may change the CRC operational code of the notification packet and/or synchronous packet to a predetermined code and transmit the predetermined code. The network repeater detects the packet for which the CRC operational code has been changed (detection by CRC check error) and discards the packet. The other master station accepts the packet having the predetermined CRC operational code, regardless of the CRC check error, and executes the above-mentioned processing. Thus, since the notification packet or synchronous packet will not be sent to the other wired LANs, traffic on the other wired LANs is not increased.

(B) First Embodiment (a) System configuration

Figure 2A:
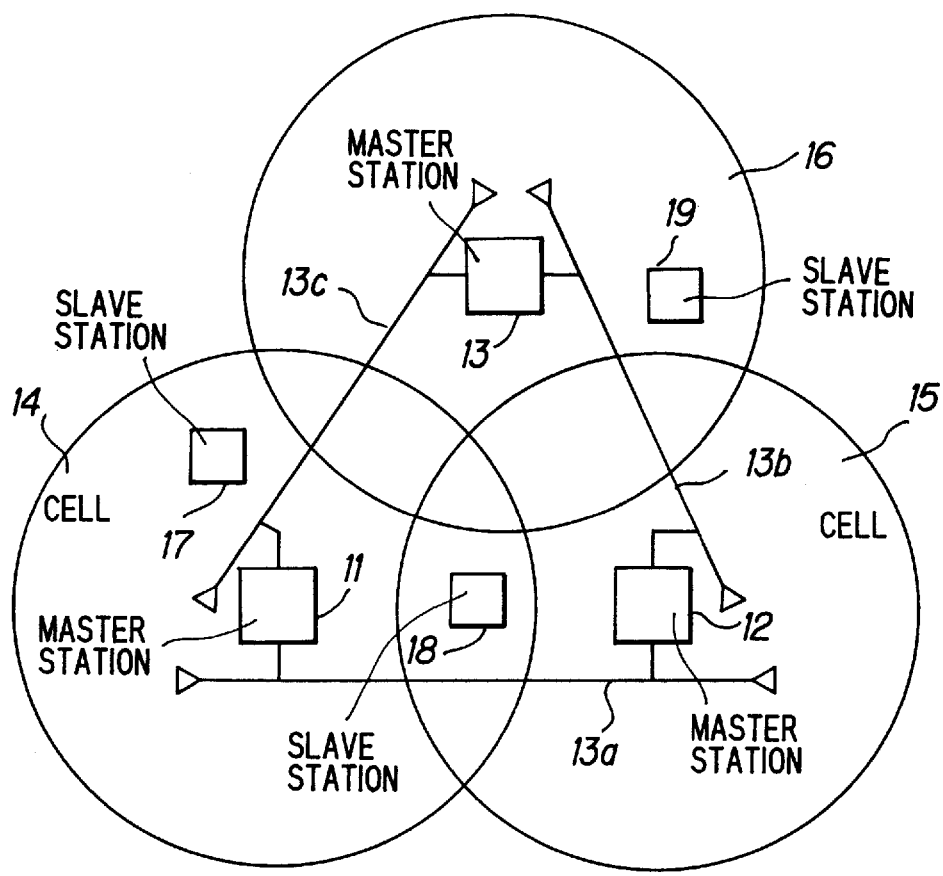
FIGS. 2A and 2B are diagrams showing the configuration of a wireless LAN system according to the present invention.
Figure 2B:
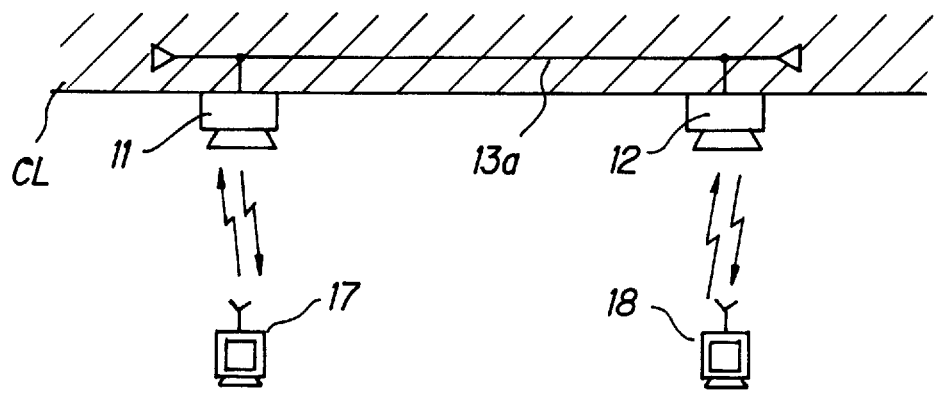

FIG. 2A is a diagram showing the configuration of a wireless LAN system according to the present invention. As shown in FIG. 2A, the wireless LAN system includes master stations 11, 12, 13 for sending/receiving frames (packets) to/from slave stations, wired LANs 13a~13c serving as backbone LANs to which the master stations are connected, cells, 14, 15, 16 conforming to the master stations 11, 12, 13, respectively, and slave stations 17, 18, 19. As shown in FIG. 2B, the wired LANs 13a~13c are laid on a ceiling CL and have the master stations 11~13 connected to them at appropriate locations.

Figure 3:
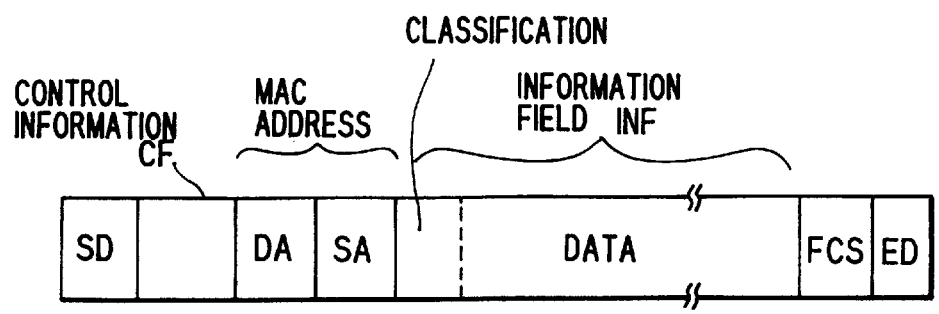
FIG. 3 is a diagram showing the composition of a frame.

FIG. 3 is a diagram showing the basic composition of a frame (packet) used in a wireless LAN. Here (1) a control field CF, (2) a layer-2 MAC address (constituted by a destination address DA and a sending address SA), (3) an information field INF and (4) a frame checking sequence FCS based upon a CRC (cyclic redundancy check) are placed between a start delimiter SD and an end delimiter ED. The information field INF contains the frame classification (notification packet, synchronous packet, etc.). In the case of an Ethernet network, the minimum byte length of a packet is 64 bytes.

(b) Construction of slave station

Figure 4:
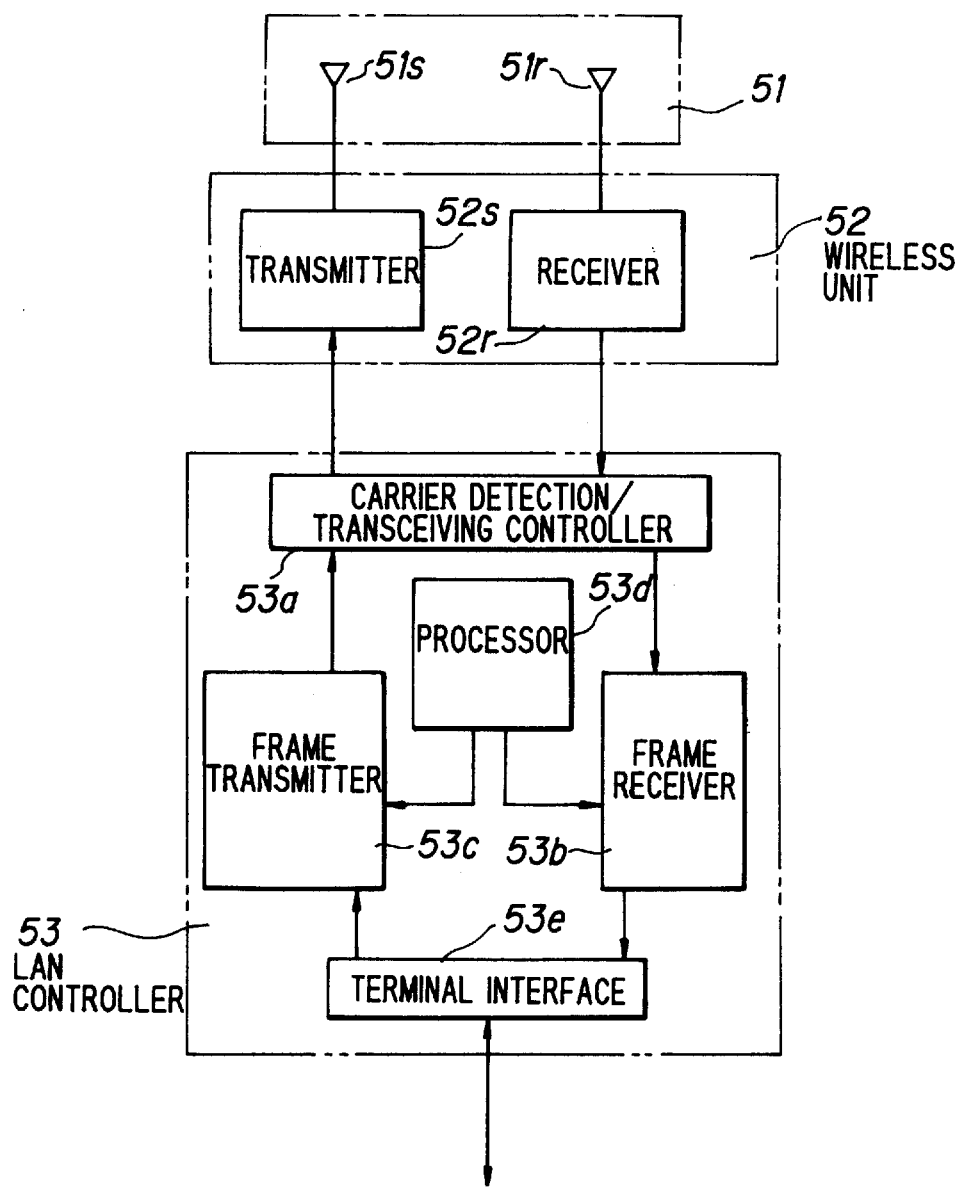
FIG. 4 is a block diagram showing the construction a slave station.

FIG. 4 is a block diagram showing the construction a slave station. The slave station includes an antenna 51 having a receiving antenna 51r and a transmitting antenna 51s, though a single antenna may be used as these two antennae. The antenna 51r, 51s are constructed to have directivity and are adjusted so as to point toward the antenna of the master station of the cell to which the slave station belongs. Numeral 52 denotes a wireless unit having a receiver 52r and a transmitter 52s. The slave station further includes a LAN controller 53 having a carrier detecting/transceiving controller 53a for detecting a carrier and controlling sending/receiving, a frame receiver 53b, a frame transmitter 53c, a frame processor 53d and a terminal interface 53e.

(c) Construction of master station

Figure 5:
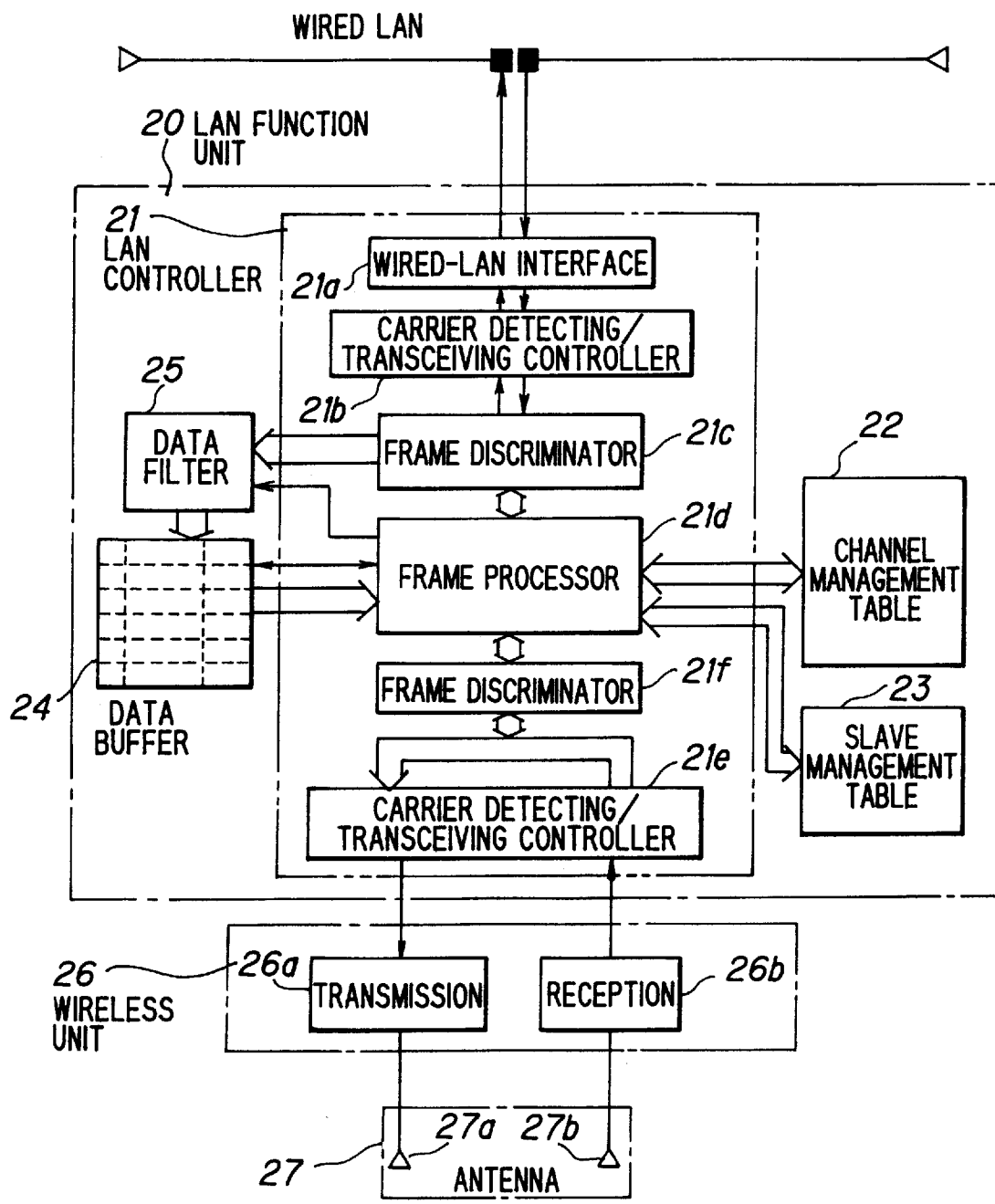
FIG. 5 is a block diagram showing the construction a master station.

FIG. 5 is a block diagram showing the construction of a master station. The master station includes a LAN functional unit having the LAN controller 21, the channel management table 22 for managing the state of use of channels, a slave management table 23 for storing the addresses of slave stations under the supervision of the master station as well as channels that have been allocated to these slave stations, a data buffer 24 for temporarily storing data addressed to the slave stations, a data filter 25 for accepting the data addressed to the slave stations under supervision and storing the data in the data buffer 24, a transceiver (radio equipment) having a transmitter 26a and a receiver 26b, and an antenna 27. Though a transmitting antenna 27a and a receiving antenna 27b are illustrated as the antenna 27, a single antenna can be used as both of these antennae.

As shown in FIG. 6, the channel management table 22 has a channel identification code column 22a, a column 22b indicating that a channel is being used by the master station itself, and a column 22c indicating that a channel is being used by another master station. It should be noted that the column 22c includes not only an indication of whether a channel is or is not in use but also the address of the other master station using a channel if the channel is in use.

As shown in FIG. 7, the slave management table 23 is so arranged as to store addresses 23a of slave stations under supervision as well as channels 23b allocated to these slave stations.

As shown in FIG. 5, the LAN controller 21 includes a wired-LAN interface 21a for interfacing the wired LAN, a carrier detection/transception controller 21b for detecting a carrier on the wired LAN and controlling the sending/receiving of frames (packets) with respect to the wired LAN, a frame discriminator 21c, a frame processor 21d, a carrier detection/transception controller 21e for detecting a carrier from a slave station and controlling the sending/receiving of frames with respect to the slave station, and a frame discriminator 21f.

The frame processor 21d has the following functions:

(1) The frame processor 21d periodically creates a notification packet for giving notification of the state of use of its own channel and broadcasts the notification packet to other master stations via the wired LANs.

(2) If a notification packet has been received, the frame processor 21d registers the state of channel use of another master station, of which it has been notified by the notification packet, in the channel management table 22.

(3) When it becomes necessary to allocate a channel to a slave station under supervision, the frame processor 21d refers to the channel management table 22, obtains a channel not being used by any other master station and allocates this channel to the slave station.

(4) When a channel has been allocated to a slave station or a channel that has been allocated to a slave station is finished being used, the frame processor 21d rewrites the indication that its own channel is in use to "IN USE" or "NOT IN USE" in the channel management table 22.

(5) In a case where an idle channel to be allocated to a slave station under supervision does not exist, the frame processor 21d decides a channel desired to be used, creates a synchronous frame in which the identification code of this channel is included in the information field INF, and introduces the frame into the wired LAN by multicasting.

(6) In a case where a synchronous frame has been received, the frame processor 21d determines whether the channel designated by the synchronous frame is being used or not. If the channel is not being used, then the frame processor 21d immediately sends an ACK frame to the master station that transmitted the synchronous frame. On the other hand, if the channel designated by the synchronous frame is being used, the frame processor 21d transmits the ACK frame after use of the channel is finished. If ACK frames are received from all master stations, the frame processor 21d of the master station that transmitted the synchronous frame allocates the above-mentioned channel to the slave station.

It should be noted that an arrangement can be adopted in which the master station refers to the channel management table 22, obtains a master station for which a channel that has been allocated to a slave station is being used, sends the synchronous frame solely to this master station and, when the ACK frame is received from this master station, allocates the channel to the slave station.

(d) Channel allocation control (d-1) Control at introduction of power

Figure 8:
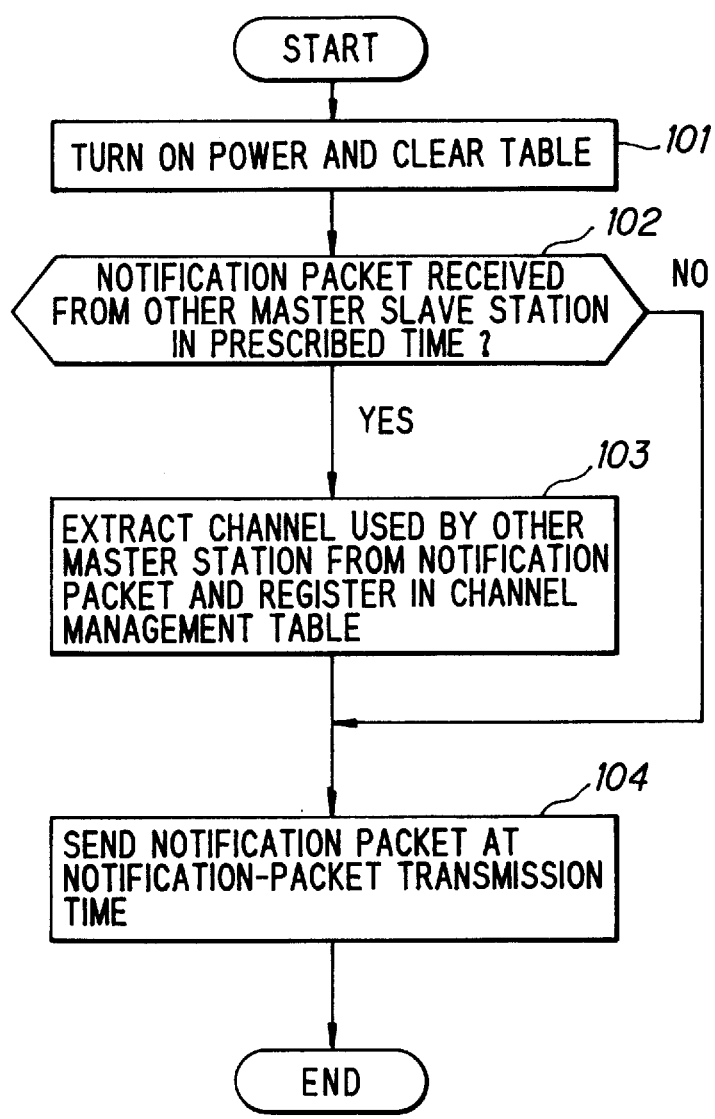

FIG. 8 is a flowchart of processing at introduction of power to a master station.

When power is introduced to a prescribed master station, say the master station 11, the frame processor 21d of the master station 11 clears the channel management table 22 (step 101). Next, the frame processor 21d checks to determine whether the notification packet has been received from the other slave stations 12, 13 via the wired LAN within the transmission period of the notification packet, e.g., several seconds (step 102).

If introduction of power to the master station 11 occurs earlier than introduction of power to the other master stations, the notification packet is not received. However, if there is another master station to which power is introduced earlier than the master station 11, the notification packet is received from this other master station. As a result, the channel used by the other master station is extracted from the notification packet and written in the channel management table 22 (step 103).

Next, at the transmission timing of the notification packet, the master station notifies other master stations of the state of its own channel use via the wired LAN (step 104) and then executes ordinary channel allocation processing, described later.

(d-2) Channel allocation control under ordinary ordinary conditions

Figure 9:
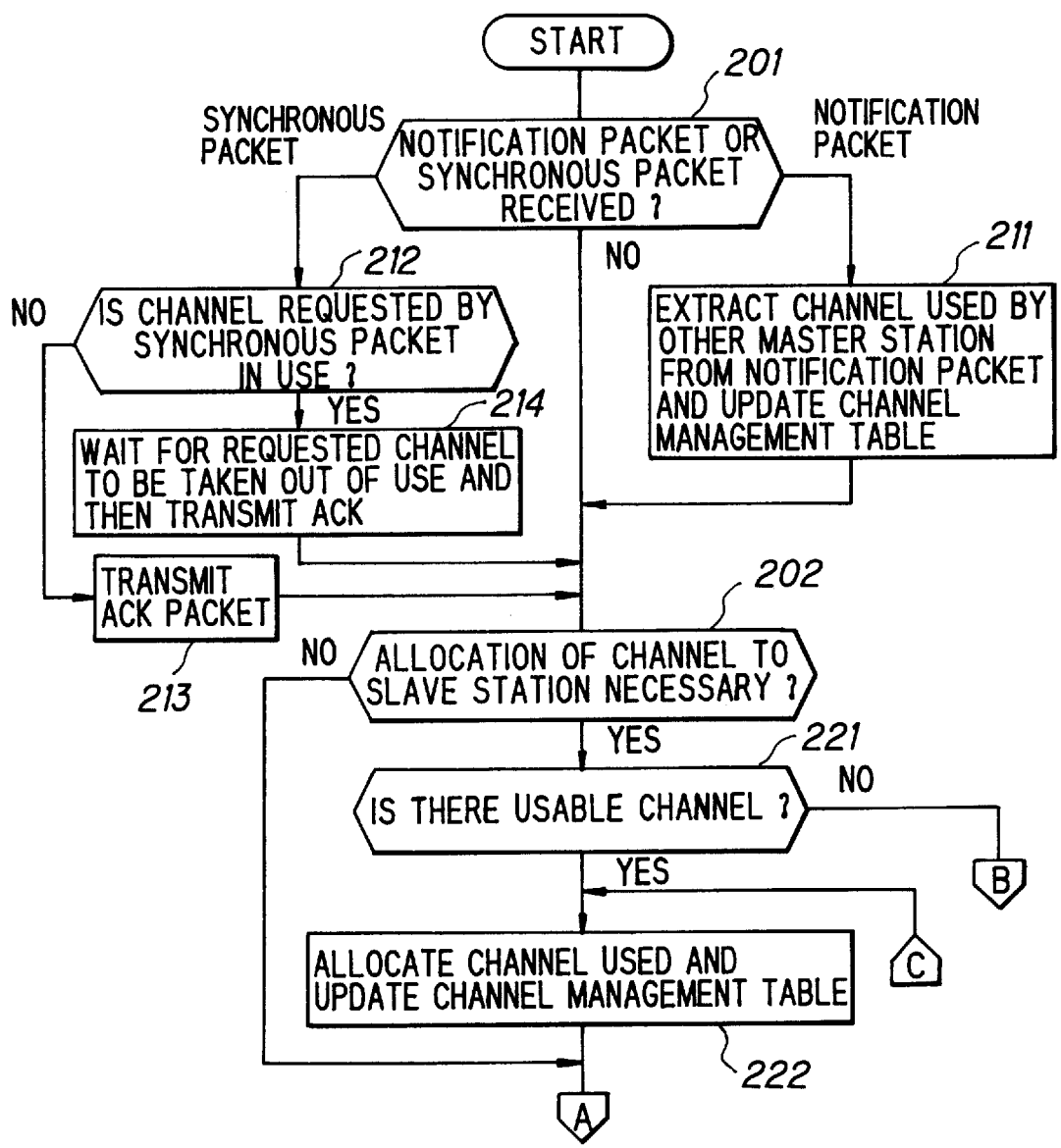
FIG. 9 is a flowchart of processing for channel allocation under ordinary conditions.
Figure 10:
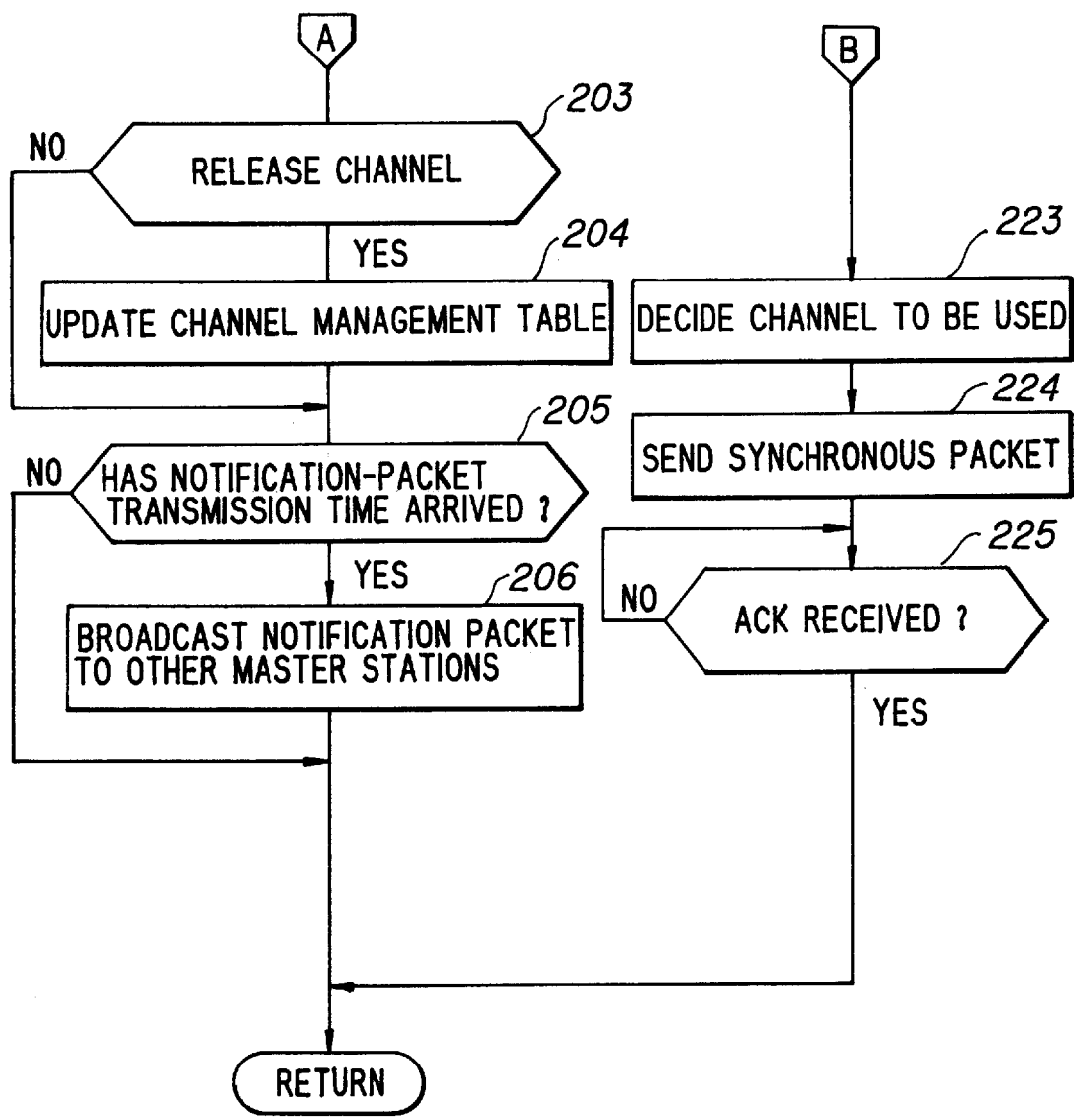
FIG. 10 is a flowchart of processing for channel allocation under ordinary conditions.

FIGS. 9 and 10 are flowcharts of processing for channel allocation under ordinary conditions.

Monitoring is performed to determine whether the notification packet or synchronous packet has been received from another master station via the wired LAN (step 201). If the packet has not been received, it is determined whether it is necessary to allocate a channel to a slave station (step 202). A case in which it is necessary to allocate a channel to a slave station is (1) a case in which a channel allocation is requested of the master station by channel control in order that the slave station under supervision may access the LAN, or (2) a case in which the master station receives a packet, which is addressed to a slave station under supervision, via the wired LAN and desires to transmit the packet to the slave station.

If it is unnecessary to allocate a channel to a slave station, then a check is made to determine whether use of a channel allocated to any slave station under supervision has ended as by the end of transmission of a packet. If use of a packet allocated to any slave station has ended, this channel is freed for use (step 203). After release of the channel, "NOT IN USE" is entered into the channel management table 22 to correspond to the released channel in column 22b, which indicates that the channel is being used by the master station itself, and updates the content of the slave management address table 23b (step 204).

Next, or if it is unnecessary to release the channel at step 203, the transmission timing of the notification packet is checked (step 205). If it is time to transmit a notification packet, the packet is created in order to notify of the state of use of the master station's own channel and the notification packet is transmitted to the other master stations by broadcast via the wired LANs (step 206). Thereafter, or in a case where the time for transmission of the notification packet has not arrived, the program returns to the beginning and the foregoing processing is repeated.

If a notification packet is received from another master station at step 201, the channel used by the other master station is extracted from the notification packet, the channel is written in the channel management table 22 in the column 22c indicating that the channel is being used by another master station (step 211) and then processing from step 202 onward is executed. In this case, "IN USE" is entered into the column 22c to correspond to the channel being used and so is the address of the master station using the channel.

If the synchronous packet is received at step 201, reference is had to the channel management table 22 to determine whether the channel being requested by the synchronous packet is currently being used (step 212). If the table 22 indicates "NOT IN USE", then the ACK packet is immediately transmitted to the sender of the synchronous packet (step 213), after which the processing from step 202 onward is executed. If the channel is currently being used, however, the ACK packet is not transmitted and the end of use of the requested channel is awaited. The ACK packet is transmitted to the sender of the synchronous packet in response to the end of use of the channel (step 214). Processing from step 202 onward is then executed.

If it is necessary to allocate a channel to a slave station at step 202, reference is had to the channel management table 22 to determine whether an idle channel to be allocated to the slave station exists (step 221). If the idle channel exists, this channel is allocated to the slave station, "IN USE" is entered into the table 22 to correspond to the allocated channel in column 22b indicating that the channel is being used by the master station itself, and the corresponding relationship between the slave address and the allocated channel is registered in the slave management address table 23 (step 222). Processing from step 203 onward is then executed.

If it is found at step 221 that an idle channel to be allocated to the slave station does not exist, the channel desired to be used is decided (step 223) and the synchronous frame is transferred to the addresses of other master stations by multicasting (step 224). Next, reception of the ACK frame is awaited (step 225). If ACK frames are received from all master stations, the program returns to step 222 via step 201. At step 222, the channel decided at step 223 is allocated to the slave station, the column 22b of channel management table 22 is rewritten, the corresponding relationship between the slave station address and the allocated channel is registered in the slave management address table 23 (step 222) and processing from this step onward is executed.

Thus, it is so arranged that the master stations use the notification packet to periodically notify one another of the channels used. As a result, the state of channel use can be ascertained, the same channel will no longer be allocated to slave stations redundantly in adjacent cells and the problem of hidden terminals will not arise.

Further, in a case where all channels are in use and an idle channel to be allocated to a slave station does not exist, the master station sends the other master stations a synchronous packet which includes identification data of the channel desired to be used. When it is ascertained by a response packet sent in response to the synchronous packet that the other stations are not using the above-mentioned channel, the master station immediately allocates this channel to the slave station and communicates with the slave station. As a result, a channel desired for use can be used immediately if it is not being used by another master station. If the channel is being used, the master station can use the channel as soon as its use ends. This makes channel allocation more efficient. Accordingly, channels can be utilized more efficiently.

(d-3) Modification

In the arrangement described above, the synchronous frame is sent to all master stations and a channel is assigned to a slave station upon receiving ACK frames from all master stations. However, it is also possible to adopt an arrangement in which the synchronous packet is sent only to the master station that is using the channel desired to be allocated to a slave station and allocate this channel to the slave station when the ACK frame has been received from the master station.

Further, it is described above that the synchronous packet is sent only if there is no idle channel. However, in a case where it is desired at all costs to allocate to a slave station a channel being used by another master station, it can be arranged to send the synchronous packet and allocate the channel to the slave station.

Furthermore, in the case described above, an ACK packet is used as the response packet to answer the synchronous packet. However, the notification packet can also be used as the response packet. In such case, the periodically transmitted notification packet can be used instead of the response packet. If this arrangement is adopted, the traffic on the wired LAN can be reduced because it will be unnecessary to transmit a special response packet.

(C) Second Embodiment (a) Configuration

Figure 11:
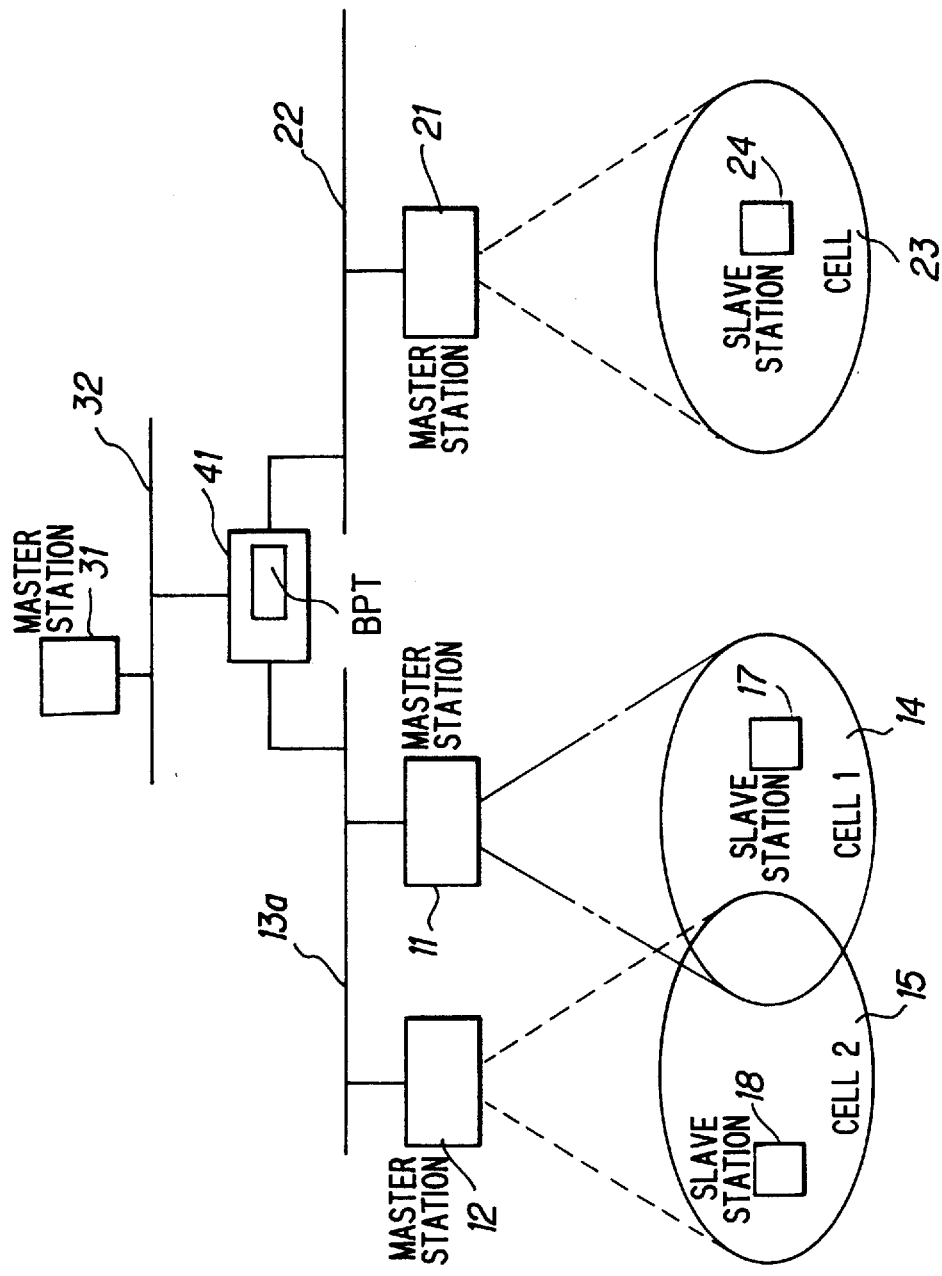
FIG. 11 is a diagram showing another configuration of a wireless LAN system.
Figure 12:
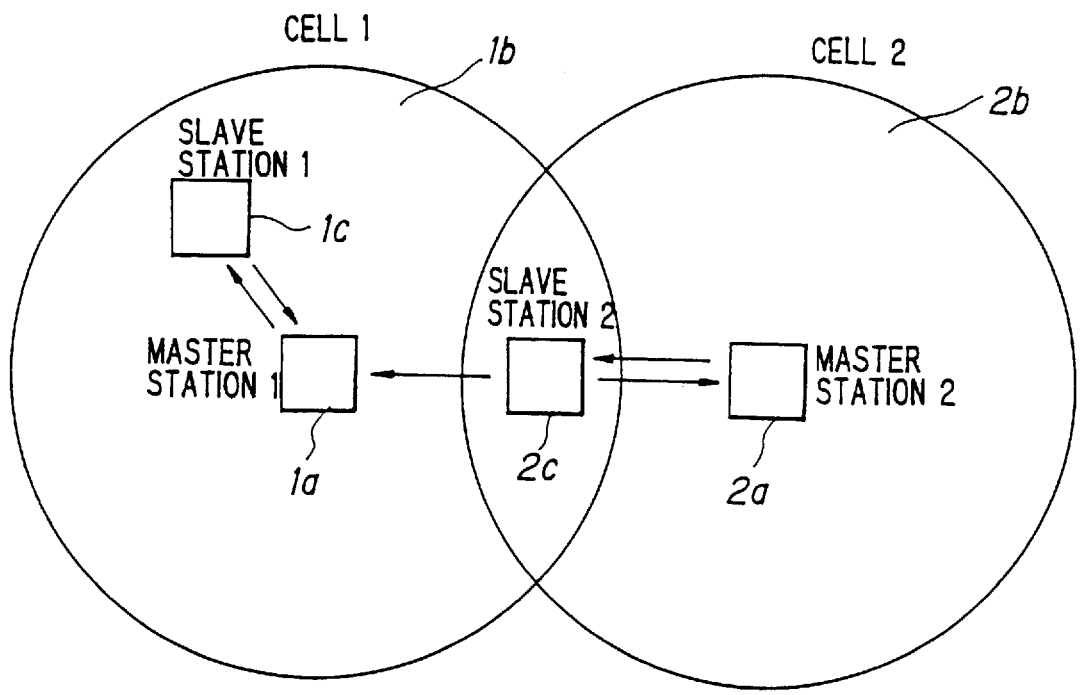
FIG. 12 is a diagram for describing the relationship between master stations and cells in a wireless LAN system.
Figure 13:
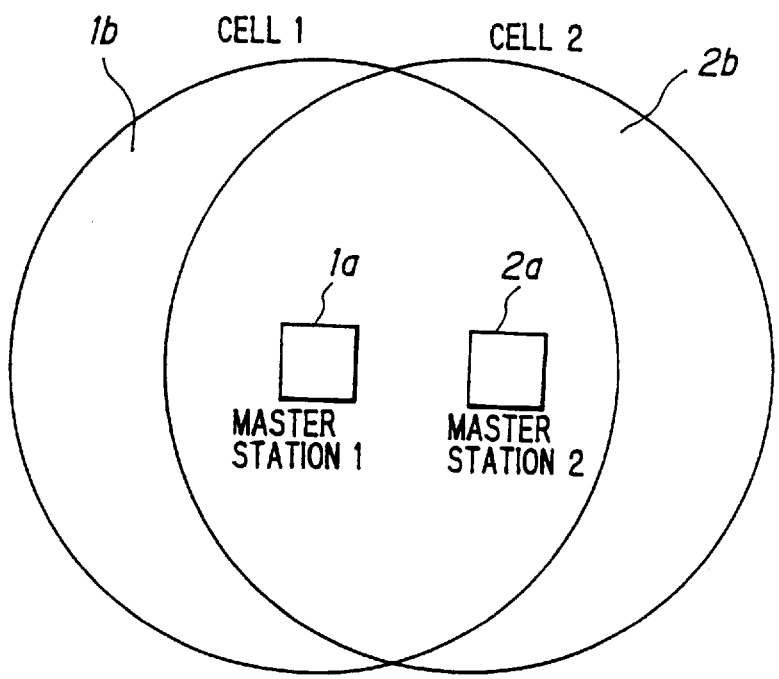
FIG. 13 is a diagram for describing the problems of the prior art.

FIG. 11 is a diagram showing another configuration of a wireless LAN system according to the present invention. As shown in FIG. 11, the wireless LAN system includes master stations 11, 12, 21, 31 for wirelessly sending/receiving packets to/from slave stations, wired LANs (backbone LANS) 13a, 22, 32 to which the master stations are connected, cells 14, 15, 23 conforming to the master stations 11, 12, 21, respectively, and slave stations 17, 18, 24. Each wired LAN is laid on a ceiling and has the master stations 11, 12, 21, 31 connected to them at appropriate locations. A network repeater 41 having a bridge function is provided between the wired LANs.

The network repeater 41 has a table (a bridge path table) which stores, for every wired LAN, the addresses of slave stations under supervision and the addresses of master stations. Upon accepting a frame from a prescribed wired LAN, the network repeater 41 refers to the table and sends the frame to the wired LAN to which the slave station and master station that are the destinations of the frame belong. Further, the network repeater 41 judges that a short packet (less than 64 bytes in case of the Ethernet network), namely a packet which is shorter than the smallest packet stipulated for the wired LAN, is indicative of an error and discards this packet without sending it to other wired LANS. Furthermore, in a case where a CRC operational code is not correct, the network repeater 41 judges that an error (CRC check error) has occurred and discards the packet without sending it to other wired LANs.

(b) Description of operation

When the wireless LAN system becomes extensive, as shown in FIG. 11, a plurality of wired LANs 13a, 22, 32, . . . are provided and the wired LANs are interconnected by the network repeater 41 such as a bridge or the like. If the wired LANs differ in such a system, the problem of hidden terminals will not arise even if the same channel is allocated redundantly. This means that it will suffice merely to send the notification packet or synchronous packet to the other master stations connected to the same wired LAN. In the second embodiment, therefore, the notification packet or synchronous packet is transmitted as a short packet smaller than the minimum packet length (64 bytes) stipulated for the wired LANs.

If this arrangement is adopted, the network repeater 41 judges the short packet as being indicative of an error, discards the packet and does not send it to the other wired LANs. On the other hand, the other master stations connected to the same wired LAN do not judge the short packet as being in error, accept the notification packet or synchronous packet, which is the short packet, and execute the processing shown in FIGS. 8 through 10.

Thus, the notification packet or synchronous packet will not be sent to another wired LAN and, hence, there will be no increase in the traffic of the other wired LAN. Moreover, since the packet has the form of the short packet, the traffic on this wired LAN to which the master station is connected can be kept low. In addition, in a case where a slave station has been connected to the wired LAN, the short packet is judged as being an abnormal packet and is discarded immediately. This makes it possible to reduce the burden upon the CPU of the slave station.

(c) Modification

The master station employs a packet of greater than 64 bytes rather than the short packet in the communication of notification and synchronous packets. Instead, the CRC operational code of the notification packet or synchronous packet is converted to a predetermined code serving as the CRC error indication.

Since the CRC operational code is not correct, the network repeater 41 judges that the notification packet or synchronous packet is erroneous, discards the packet and does not send it to other wired LANS. On the other hands, the other master stations connected to the same wired LAN do not render an error judgment in the case of the predetermined CRC operational code, even if the CRC error is indicated. These master stations accept the notification packet and synchronous packet and execute the processing shown in FIGS. 8 through 10.

Even if this arrangement is adopted, there is no increase in the traffic on the other wired LANs because the notification packet and synchronous packet are not sent to the other wired LANs. In a case where a slave station is connected to the wireless LAN, the packet is construed to be an abnormal packet based upon the CRC error and this packet is discarded. This makes it possible to reduce the burden upon the CPU of the slave station.

Thus, in accordance with the present invention, master stations periodically notify one another of channels used by sending notification packets. As a result, the status of channel use can be ascertained and the problem of hidden terminals does not arise because the same channel is not allocated to slave stations redundantly in neighboring cells.

In a case where all channels are in use and an idle channel for allocation to a slave station does not exist, a master station sends another master station a synchronous packet containing identification data of a channel desired to be used. If it is ascertained based upon a packet in response to the synchronous packet that the other station is not using the above-mentioned channel, the master station immediately allocates this channel to the slave station and communicates with the slave station. As a consequence, if a channel that is desired to be allocated to a slave station is not being used by another master station, the channel can be used immediately. If the channel is being used, the master station can use the channel at the end of its use. This makes channel allocation more efficient.

In accordance with the present invention, a notification packet used periodically can be substituted as a response packet sent in response to a synchronous packet. In such case the traffic on the wired LAN can be reduced because it is unnecessary to transmit a special response packet.

Further, in accordance with the present invention, the notification packet or synchronous packet is constructed in the form of a short packet the length of which is less than the minimum packet length stipulated by the wired LAN. As a result, the short packet is discarded by the network repeater and is not sent to other wired LANs. This means that there is no increase in the traffic on the other wired LANs. Moreover, since the packet has the form of the short packet, the traffic on this wired LAN to which the master station is connected can be kept low. In addition, in a case where a slave station has been connected to the wired LAN, the short packet is judged as being an abnormal packet and is discarded immediately. This makes it possible to reduce the burden upon the CPU of the slave station.

Furthermore, in accordance with the present invention, a CRC operational code of the notification packet or synchronous packet is converted to a predetermined code serving as a CRC error indication. As a result, the packet is discarded by the network repeater based upon the CRC error and the packet is not sent to the other wired LANs. In a case where a slave station has been connected to the wired LAN, the packet is judged as being an abnormal packet based upon the CRC error and the packet is discarded immediately. This makes it possible to reduce the burden upon the CPU of the slave station.

As many apparently widely different embodiments of the present invention can be made without departing from the spirit and scope thereof, it is to be understood that the invention is not limited to the specific embodiments thereof except as defined in the appended claims.

What is claimed is:

1. A master station in a wireless LAN system having a plurality of master stations each connected to a wired LAN and a plurality of slave stations each connected to a terminal for wirelessly sending and receiving signals to and from one of said plurality of master stations via a prescribed channel, each master station comprising:

a table for managing state of channel use by other master stations;

means for transmitting state of use of its own channel to other master stations periodically in the form of a notification packet;

means for receiving and storing state of channel use of said other master stations in said table when a notification packet has been received from each of said other master stations;

means for selecting a channel not being used by said other master stations upon referring to said table when communication is to be performed with a slave station under supervision; and means for communicating with the slave station via the channel selected.

2. The master station according to claim 1, each master station further comprising means for storing state of channel use of its own channel in said table.

3. The master station according to claim 2, each master station further comprising:

means for sending each of said other master stations a synchronous packet containing identification data of a channel desired to be used; and means for selecting said channel and communicating with the slave station when it is ascertained, based upon a response packet that is sent from each of said other master stations in response to said synchronous packet, that said other master stations are not using said channel.

4. The master station according to claim 3, each master station further comprising means which, when the synchronous packet has been received, is for referring to said table to determine whether a channel specified by the channel identification data contained in said synchronous packet is being used by itself and, if said channel is not being used, for transmitting an ACK packet as said response packet.

5. The master station according to claim 3, further comprising means which, when the synchronous packet has been received, is for transmitting said notification packet as a response to said synchronous packet.

6. A wireless LAN system having a plurality of master stations each connected to a wired LAN and a plurality of slave stations each connected to a terminal for wirelessly sending and receiving signals to and from one of said plurality of master stations via a prescribed channel, wherein each master station comprises:

a table for managing state of channel use by other master stations;

means for transmitting state of use of its own channel to other master stations periodically in the form of a notification packet;

means for receiving and storing state of channel use of said other master stations in said table when a notification packet has been received from each of said other master stations;

means for selecting a channel not being used by said other master stations upon referring to said table when communication is to be performed with a slave station under supervision; and means for communicating with the slave station via the channel selected;

each master station referring to said table when channel allocation has been requested by the slave station under supervision, selecting a channel for communicating with said slave station and then communicating with the slave station via the channel selected.

7. The LAN system according to claim 6, wherein each master station further comprises:

means for storing state of channel use of its own channel in said table; and means for rewriting state of channel use of its own channel in said table when the channel is allocated to a slave station or when an allocated channel is taken out of use.

8. The LAN system according to claim 7, wherein each master station further comprises:

means for sending each of said other master stations a synchronous packet containing identification data of a channel desired to be used; and means for selecting said channel and communicating with the slave station when it is ascertained, based upon a response packet that is sent from each of said other master stations in response to said synchronous packet, that said other master stations are not using said channel.

9. The LAN system according to claim 8, further comprising a network repeater connected to a plurality of wired LANs for relaying packets sent and received between wired LANs, wherein each master station transmits the notification packet and synchronous packet in the form of a short packet no larger than a minimum packet length stipulated for the wired LANs, said network repeater detects and discards the short packet, and other master station connected to the same wired LAN as said master station which transmits said packets, accepts the short packet and executes said processing.

10. The LAN system according to claim 8, further comprising a network repeater connected to a plurality of wired LANs for relaying packets sent and received between wired LANs, wherein each master station changes a CRC operational code of the notification packet and synchronous packet to a predetermined CRC operational code and transmits the packet of the predetermined CRC operational code, the network repeater detects a CRC error and discards the packet, and other master station connected to the same wired LAN as said master station which transmits said packets, accepts the packet having the predetermined CRC operational code and executes said processing.

* * * * *